United States Patent

[11] 3,619,259

[72] Inventors Archibald N. Wright;
Wilfred F. Mathewson, Jr., both of Schenectady, N.Y.

[21] Appl. No. 812,262
[22] Filed Apr. 1, 1969
[45] Patented Nov. 9, 1971
[73] Assignee General Electric Company
Continuation-in-part of application Ser. No. 628,447, Apr. 4, 1967.

[54] PHOTOPOLYMERIZED FILM, COMPOSITE THEREOF, AND METHOD OF FORMING
11 Claims, 6 Drawing Figs.

[52] U.S. Cl. .......... 117/93.31, 204/159.11
[51] Int. Cl. .......... B44d 1/50
[50] Field of Search .......... 117/93.31; 260/78 U, 78 TF, 78 L; 51/298; 204/159.11, 159.22

[56] References Cited

UNITED STATES PATENTS

| | | | |
|---|---|---|---|
| 3,151,182 | 9/1964 | Alexander | 260/78 X (U) |
| 3,260,686 | 7/1966 | Seifert et al. | 260/78 X (U) |
| 3,271,180 | 9/1966 | White | 204/159.22 X |
| 3,272,897 | 9/1966 | Herman et al. | 117/100 X (I) |
| 3,295,940 | 1/1967 | Gerow | 51/298 |
| 3,406,148 | 10/1968 | Sambeth et al. | 260/78 X (TF) |
| 3,386,851 | 6/1968 | Harlan | 117/100 X (I) |
| 3,426,228 | 2/1969 | Barrie et al. | 260/78 X (U) |

*Primary Examiner*—Alfred L. Leavitt
*Assistant Examiner*—J. H. Newsome
*Attorneys*—Richard R. Brainard, Paul A. Frank, Joseph T. Cohen, Charles T. Watts, William A. Teoli, Frank L. Neuhauser, Oscar B. Waddell and Joseph B. Forman

ABSTRACT: A thin, continuous film is formed on a substrate by the ultraviolet surface polymerization of the vapor of an imide containing photopolymerizable organic material. Such films are useful as coatings on metallic and nonmetallic substrates, capacitor dielectrics, cryogenic device insulation, insulation for microelectric devices, insulation on electrically conductive wire, and for corrosion protection.

Inventors:
Archibald N. Wright;
Wilfred F. Mathewson, Jr.,
by
Their Attorney.

PHOTOPOLYMERIZED FILM, COMPOSITE THEREOF, AND METHOD OF FORMING

PHOTOPOLYMERIZED FILM, COMPOSITE THEREOF, AND METHOD OF FORMING

This application is a continuation-in-part of Ser. No. 628,447, filed Apr. 4, 1967, and assigned to the same assignee as the present invention. The present invention relates to a method of forming a continuous imide-containing organic film, a method of making a composite of such film on a substrate, and the products produced by such method.

Films which can be configuratively deposited are desirable for a wide variety of applications. It is further desirable that films and coatings be adherent when formed on a substrate and continuous thereon. The present invention is directed to such improved films, coatings and composites of such films or coatings which exhibit the above-desirable characteristics and to methods of forming such films, composites and coatings, and products made therefrom. The continuous films are formed by the ultraviolet surface photopolymerization of the vapor of an imide-cantaining photopolymerizable organic material. Suitable materials include phthalimide, succinimide, hexahydrophthalimide, pyromellitic ciimide, benzophenone diimide

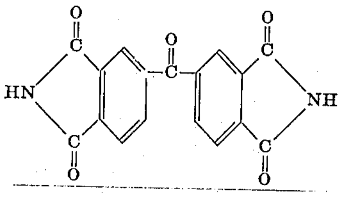

ethylene glycol-bis (trimellitate) diimide, and a ciimide having the formula,

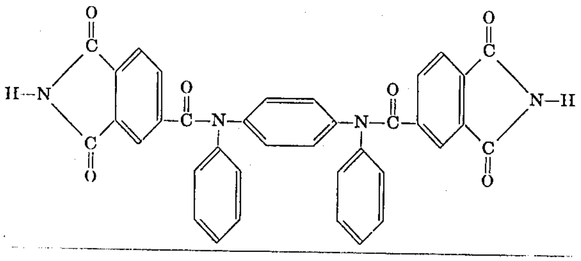

The dianhydride, from which the diimide of formula 1 is formed, is prepared in accordance with Holub Pat. No. 3,410,875, filed Mar. 17, 1965, and assigned to the same assignee as the present application. The diimide of formula 1 is prepared in accordance with the method of Igor Sausa, Chem. Zvesti, Vol. 16, Page 574 (1962 ) employing urea with the aforementioned dianhydride.

A preferred class of imide-containing photopolymerizable organic materials which can be employed in the practice of the invention are substituted maleimides. Some of the maleimides which can be employed in the practice of the invention are included by the formula,

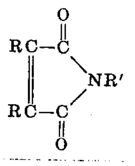

where R is selected from hydrogen and alkyl radicals, and R' is selected from hydrogen and monovalent hydrocarbon radicals. Bismaleimides also can be used in the practice of the invention which include compounds of the fomula,

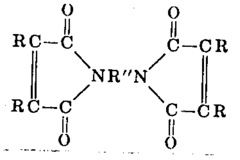

where R is defined above, and R'' is a divalent organic radical.

Radicals included by R are, for example, hydrogen and alkyl radicals, such as methyl, ethyl, propyl, butyl, pentyl, hexyl, and octyl. Radicals included by R', are for example, hydrogen, all of the aforementioned alkyl radicals of R, aryl radicals and halogenated aryl radicals, such as phenyl, chlorophenyl, tolyl, xylyl, naphthyl, etc. Radicals included by R'' are, for example, alkylene radicals, such as ethylene, propylene, butylene, etc., arylene radicals, such as phenylene, chlorophenylene, tolyene, naphthylene, anthrylene, etc. and R''' Y R''' radicals, where R''' is selected from arylene radicals, as previously defined, and Y is a divalent radical selected from alkylene as previously defined, —S—, $-SO_2-$, —C(=O)—, and —O—

Among the maleimides of formula 2 which can be employed in the practice of the invention are, for example, maleimide, N-methylmaleimide, N-vinylmaleimide, N-phenylamaleimide, etc. imide derivatives of citraconic anhydride, such as methylmaleimide, methyl, N-methylmaleimide methyl, N-phenylmaleimide, dimethyl, N-phenylmaleimide, etc.

Among the bismaleimides of formula 3 there are included, for example, methylene dianiline bismaleimide, and bismaleimides shown by the following formulas,

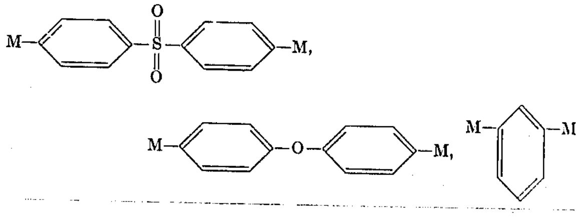

etc., where M is selected from

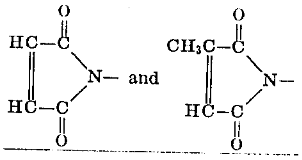

The films of the present invention can be configurationally deposited to provide for such advantages as integrated circuitry. In addition, these films are continuous and adherent, have high dielectric strength, and dielectric constants are imperforate, exhibit good temperature stability, and have mechanical and electrical continuity at a thickness less than 1,000 angstroms, for example, as low as 125 angstroms. Coatings formed in accordance with the invention exhibit good chemical resistance. These films and coatings are useful for a wide variety of applications including covering layers for various metallic and nonmetallic substrates, capacitor dielectrics, cryogenic device insulation, insulation for microelectric devices, primer or insulation on electrically conductive wire, and for corrosion protection. When employed as enamel or insulation on electrically conductive wire, the coatings made in accordance with the invention can be utilized, for example, as a primary dielectric layer in combination with inorganic barrier material, such as mica reinforced woven glass tape bonded directly to the conductor with a silicone resin adhesive. Films and coatings formed in accordance with our invention are also useful on diamonds, on cubic boron nitride (known as borazon) which is disclosed and claimed in U.S. Pat. No. 2,947,617.

The method and products of the present invention are to be distinguished from the teaching of copending application of Archibald N. Wright, Ser No. 530,971, now U.S. Pat. No. 3,522,226 filed Mar. 1, 1966, and assigned to the same assignee as the present application. In that application, there are disclosed and claimed films, coatings, and products including such films or coatings formed by ultraviolet surface photopolymerization of organic materials selected from the group consisting of hexachlorobutadiene, tetrafluoroethylene, trifluoromonochloroethylene, monofluorotrichloroethylene, hexafluorobutadiene, acrylonitrile, and mixtures thereof.

The present invention is based on a discovery that the vapor of an imide-containing photopolymerizable organic material can be converted to a high temperature resistant supported films, coatings, or unsupported films, by surface photopolymerization with ultraviolet light. Unsupported films can be made by effecting polymerization of the vapor of an imide-containing organic material on the surface of a substrate, for example, a metal substrate, followed by removal of the substrate by techniques such as etching.

In accordance with the invention, there is provided a method which comprises effecting the formation of a continuous, imperforate temperature-resistant flexible film on the surface of a substrate by the ultraviolet surface photopolymerization of the vapor of an imide-containing photopolymerizable organic material, as previously defined.

In order to fully understand the invention, reference can be made to the accompanying drawing and the following description in which.

Figure 1:
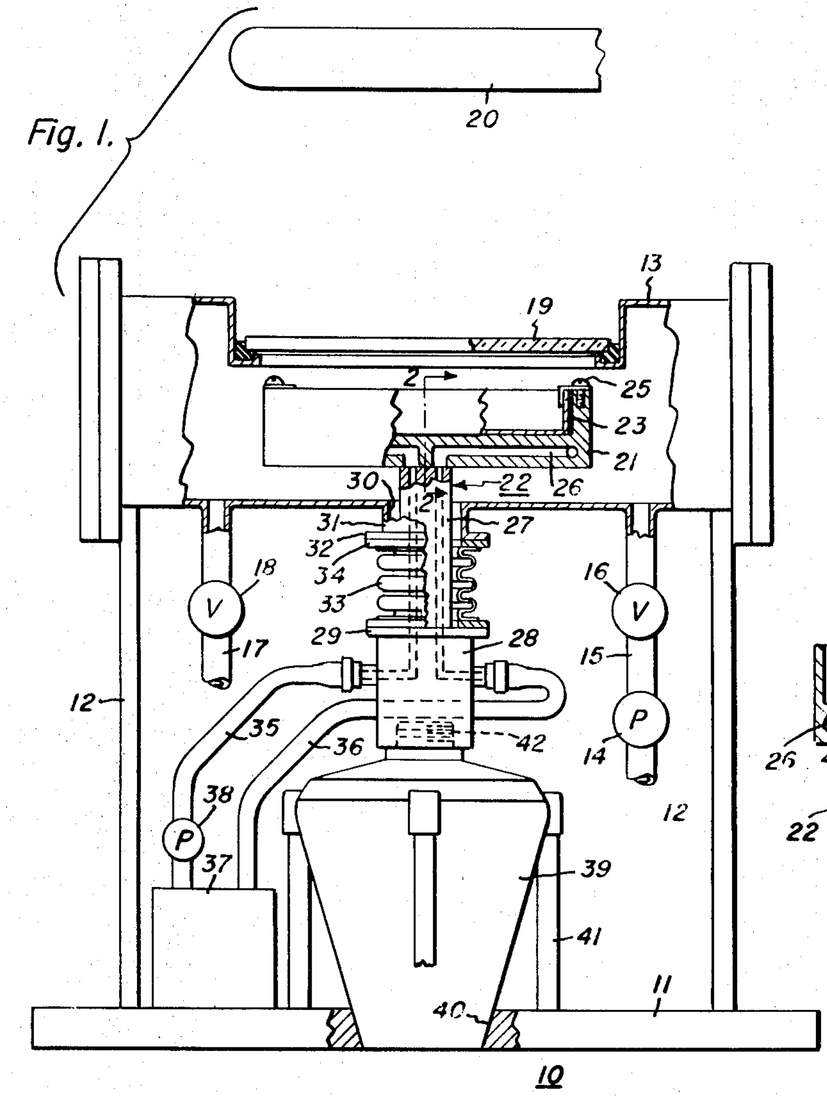
FIG. 1 is a side elevational view partially in section of apparatus for forming films, coatings and products in accordance with our invention.

In FIG. 1 of the drawing, an apparatus is shown generally at 10 for forming films, coatings and products having such films or coatings thereon in accordance with our invention. A base 11 is provided on which is mounted a pair of support members 12. An enclosure 13 is positioned upon support members 12. A vacuum pump 14 is connected by a line 15 to enclosure 13 to evacuate the latter. A control valve 16 is provided in evacuation line 15. An inlet line 17 is connected at one end to enclosure 13 and at its other end to a source (not shown) of material to be supplied in gaseous form to enclosure 13. A control valve 18 is provided in line 17 to control the supply of material to enclosure 13. An ultraviolet light transmitting window 19 is shown positioned in the upper wall portion of enclosure 13 and is removed therefrom.

An ultraviolet light 20, which is normally provided with a reflector (not shown), is shown outside and spaced above enclosure 13 in alignment with window 19. However, light 20 can be positioned inside enclosure 13. Light 20 is supported in any suitable manner. Such a light source can provide ultraviolet light in the region of up to about 3,500 angstroms, and which is directed by its reflector (not shown) through window 19 into enclosure 13. It is preferred to employ ultraviolet light in the wavelength range of between 1,800 to 3,000 angstroms. A metal hood (not shown) is also positioned around the enclosure and light source. A substrate support member 21 is positioned within enclosure 13 and connected to the driven end of a driver shaft 22. A tray or container 23 is located within the upper recessed portion of member 21 to provide a container for material to be used during the operation of apparatus 10. Brackets 24 are shown at opposite ends of tray 23, which brackets are fastened by means of screws 25 to support member 21. A cooling tube 26 is imbedded in substrate support member 21 to provide cooling for the member, associated tray 23 and material placed in tray 23.

Since apparatus 10 is useful for coating diamonds, borazon and other particle material, there is provided a driver shaft 22 which has an upper drive portion 27 and a lower driven portion 28. Driver portion 27 of shaft 22 has a smaller diameter than driven portion 28. Shaft 22 is shown with a flange 29 at the junction of portions 27 and 28. Driven portion 27 of shaft 22 extends through an aperture 30 in the wall of enclosure 13. A closure 31 with an associated flange 32 extends outwardly from and surrounds aperture 30. A diaphragm 33 with a flange 34 at each end is connected by means of these flanges to associated flange 32 of closure 31 and to flange 29 on driver shaft 22. In this manner a vacuum can be maintained in enclosure 13 while shaft 22 can be vibrated. Tube 26 within substrate support member 21 continues through the interior of shaft 22 and is connected to an inlet tube 35 and an outlet tube 36. Tubes 35 and 36 are connected to a cooling unit 37 which is shown positioned outside enclosure 13 and supported on base 31. Unit 37 consists of, for example, a dewar flask in which is positioned a coil connected to the ends of tubes 35 and 36, and which is filled with ice. A thermometer (not shown) is positioned in the ice to record the temperature within unit 37. Other cooling units, such as a heat exchanger or a refrigeration device, can also be employed. A circulating pump 38 is connected to inlet tube 35 to circulate a coolant through tube 35, tube 26 and outlet tube 36. A wide variety of coolants might be employed, for example, water or ethanol.

A vibrating device 39 is shown positioned in a recess 40 in base 11. A plurality of support members 41 are attached to base 11 and to device 39 to position the device. The upper end of device 39 fits into a recess 42 in the end of a driven portion 28 of shaft 22. For example, a multiimpedance driver unit might be employed for device 39.

Figure 2:
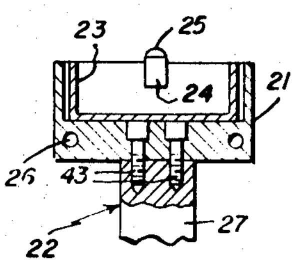
FIG. 2 is a sectional view of a portion of the apparatus taken in line 2—2 of FIG. 1.

In FIG. 2 of the drawing, there is shown a sectional view of a portion of apparatus 10 taken on line 2—2 of FIG. 1. In FIG. 2 the end of driver portion 27 of shaft 22 is shown connected to substrate support member 21 by means of threaded fasteners 43. In this manner, the drive end 27 of shaft 22 is connected to substrate support member 21 and positions this member within enclosure 13.

Figure 3:
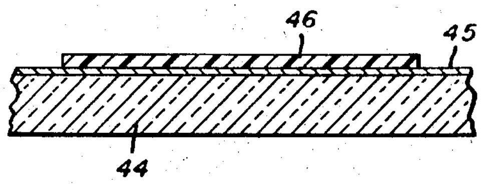
FIG. 3 is a sectional view of the substrate with a continuous film thereon formed in accordance with our invention.

In FIG. 3 of the drawing, there is shown a glass substrate support 44 and a 0.25 micron thick aluminum film substrate 45 thereon. A continuous film 46 is shown adhering firmly to the upper surface of the aluminum film 45 in accordance with the method of our invention using the apparatus shown in FIG. 1.

Figure 4:
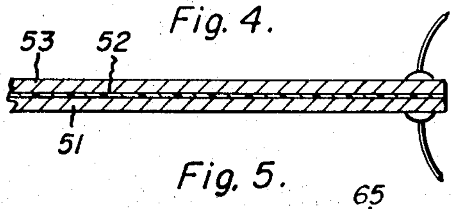
FIG. 4 is a sectional view of an improved capacitor embodying our invention.

In FIG. 4 of the drawing, there is shown in section a capacitor which has a first electrode 51, a continuous dielectric film 52, a second electrode 53 in contact with the dielectric film 52 and electrical leads connected to each of the electrodes. Film 52 is formed on the upper surface of electrodes 51 in the apparatus shown in FIG. 1 of the drawing. Such a capacitor can also be made by employing a composite sheet having a first electrode 51, a dielectric film 52 thereon, and a second electrode 53 in contact with film 52. The composite sheet can be cut, subsequently into a plurality of smaller sheets. Each of the smaller sheets has a pair of leads attached to its electrodes thereby forming a plurality of capacitors.

Figure 5:
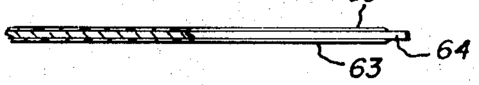
FIG. 5 is a metal substrate with a continuous film on both sides formed in accordance with the invention.

In FIG. 5 of the drawing, there is shown a metal substrate 64 having a dielectric film 63 on one side and a dielectric film 65 on the opposite side. The metal substrate 64 can be flexible, such as aluminum foil, which can be treated in accordance with the invention to effect the simultaneous surface polymerization of the vapor of an imide-containing photopolymerizable organic material, such as the N-phenyl maleimide, as previously described. The aluminum foil can have a thickness of about one-fourth mil, while the dielectric film on its lower and upper surface can have a thickness in the range of from 125 angstroms to 100,000 angstroms and preferably 1,000 to 25,000 angstroms.

Figure 6:
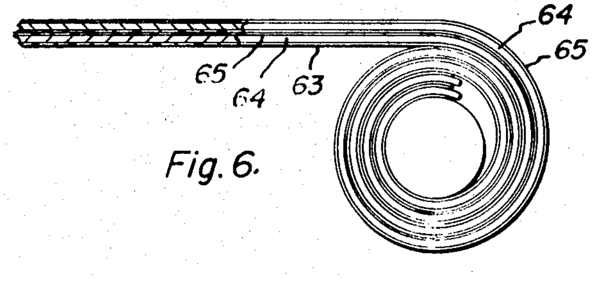
FIG. 6 is a sectional view of a capacitor roll made in accordance with the invention.

In FIG. 6, there is shown a capacitor roll which is formed by wrapping two composites of FIG. 5 in a simultaneous manner around a mandrel. Alternatively, a capacitor roll can be formed by winding a composite dielectric film. It is preferred to employ ultraviolet light having a wavelength in the range of 1,800 angstroms to 3,000 angstroms, while up to 3,500 angstroms can be employed. A vapor pressure for the imide-containing organic material can be in the range of from 0.1 to 4.0 millimeters of mercury. We have found further that subsequent to the formation of the above type of continuous film formed on the substrate, the substrate can be removed, for instance, by chemical etching with hydrochloric acid or hydrofluoric acid, thereby providing an unsupported body of the film.

We found further that many metallic and nonmetallic substrates can be employed in various forms and configurations such as tubes, filaments, fibers, yarn, whiskers and particles. For example, such a film is formed on metallic substrates including lead, niobium, copper gold, steel, iron, brass and aluminum. Various nonmetallic materials can be used such as glass, quartz, mica, carbon and boron.

In an illustrative operation of the apparatus shown in FIG. 1 of the drawing, tray 23 is filled with a monolayer of diamond particles, which tray had been affixed previously to substrate support block 21. Window 19 is then positioned in the upper wall of enclosure 13. Vacuum pump 24 is started and pumped down the chamber defined by enclosure 13 to a pressure of about 1 micron. Valve 16 is then closed. A material, which is photopolymerizable in the form of a vapor, is supplied from a solid source (not shown), such as pyromellitic diimide, which is positioned in an area which will be shaded in enclosure 13.

The monomer, pyromellitic diimide, is heated by a suitable heating source (not shown) to about 205° C. to provide a vapor pressure of about 100 microns. Ultraviolet lamp 20 is shown positioned outside and in alignment with window 19 and substrate support member 21. However, lamp 20 can be positioned inside enclosure 13. In the latter event, no additional heating source is required to vaporize the solid material. The lamp, which can have an effective wave length in the range of 2,000 to 3,500 angstroms, is turned on whereby the temperature of the substrate support member 21 increases and the vapor pressure rises. A metal hood (not shown) is positioned around apparatus 10 since this particular light source is used.

Vibratory device 39 is turned on, whereupon shaft 22 is vibrated. Substrate support member 21, which is connected to the driven end of shaft 22, is vibrated by shaft 22, which vibration causes the diamond particles in tray 23 to move in a random fashion. In this manner, a larger surface area of the particles is exposed to both the monomer and the light source during the operation of the apparatus.

After a period of time, lamp 20 is shut off, vibratory device 39 is turned off, and the system is pumped down to about 10 microns pressure to remove all by-products. The metal hood is removed and the vacuum is broken. Enclosure 13 is cooled to room temperature and, subsequently, window 19 is removed. Tray 23 is removed from substrate support member 21 and the diamond particles in the tray are examined. The particles have a color as opposed to the gray color of the initial, uncoated diamonds. Upon further examination under a microscope these diamond particles show an adherent, thin, continuous, imperforate film formed on at least a portion of the faces of the diamond particles. Such electrically insulating films are useful for bonding the diamonds to wheel matrices.

In a second illustrative operation of the apparatus shown in FIG. 1 of the drawing, a substrate support in the form of a 1 inch × 3 inches glass microscope slide with a 0.25 micron thick aluminum film substrate thereon was positioned on support block 21. A stainless steel light mask of dimensions 1 inch × 3 inches with a single slot therein was places on the upper surface of the aluminum film substrate thereby covering the film substrate except for the slot. Ultraviolet lamp 20 is positioned within enclosure 13 and in alignment with the upper surface of the aluminum film.

Window 19 is then positioned in the upper wall of enclosure 13. Vacuum pump 24 is started and pumped down the chamber defined by enclosure 13 to a pressure of about 5 microns, valve 16 is then closed. A material, which is photopolymerizable in its gaseous state, is supplied from a solid source (not shown), such as pyromellitic diimide, which is positioned in an area which will be shaded in enclosure 13.

The monomer, pyromellitic diimide, is heated by lamp 20 to about 205° C., to provide a vapor pressure of about 100 microns. The temperature of the substrate support member 21 increases to about 300° C. A metal hood (not shown), is positioned around apparatus 10 since this particular light source is used.

Pump 38 is turned on and a coolant, such as ethanol, is circulated through inlet tube 35, tube 26, and outlet tube 36, thereby cooling substrate support member 21, the substrate support and its associated aluminum film substrates to a temperature still above 205° C.

After a period of time, lamp 20 is shut off, and the system is pumped down to about 10 microns pressure to remove all by-products. The metal hood is removed and the vacuum is broken. Enclosure 13 is cooled to room temperature and subsequently, window 19 is removed. The light mask is lifted off the aluminum film substrate and the substrate support member removed from substrate support member 21. Examination showed an adherent, thin, continuous, imperforate, electrically insulating film had been formed on the area of the aluminum film substrate which were in registry with the opening in the light mask.

Examples of films, coatings, and composites and products including such films and coatings embodying our invention and methods of making such films, coatings, and composites and products including such films and coatings in accordance with our invention are set forth below:

EXAMPLE 1

Apparatus was set up in accordance with FIG. 1 of the drawing. A substrate support, a microscope glass slide 1 inch × 3 inches, which was provided with a 0.25 micron thick aluminum film substrate thereon, was positioned on the support block in the enclosure. A stainless steel light mask 1 inch × 3 inches with a single slot therein was placed on the surface of the aluminum substrate. Solid pyromellitic diimide was placed on the support block in an area to be shaded from the light source. An ultraviolet light source, in the form of an Hanovia 700 watt lamp with a reflector was positioned within the enclosure and above the upper surface of the aluminum film substrate. The window was then positioned in the upper wall of the enclosure. The system was pumped down to a pressure of 5 microns and the control valve was closed. A metal hood was positioned around the apparatus. The pyromellitic diimide was heated by the lamp to about 205° C, to provide a vapor pressure of 100 microns. The lamp had an effective wave length in the range from 2,000 to 3,500 angstroms. During photopolymerization, which was continued for 185 minutes under the light source, the monomer pressure rose to about 1 torr. In this operation, a bright, bluish-colored film was formed on the aluminum film substrate by ultraviolet surface photopolymerization of pyromellitic diimide in the gaseous phase.

While it is not shown in the drawing, a plurality of thermocouples was provided to measure the temperature of the evaporated aluminum film to provide temperature information. Cooling means for the substrate support member, which are shown in FIG, 1 of the drawing and described above, were not employed in this example. An average temperature of 300° C. was obtained for the aluminum film. The process was concluded by turning off the ultraviolet pump control valve, and pumping down the interior of the enclosure to a pressure of about 10 microns to remove gaseous material and any by-products therefrom. The vacuum was then broken and the window removed. The light mask was removed and the aluminum film on the glass substrate was examined. Visual examination disclosed a thin film which was continuous. The film was measured by interferrometry and showed a thickness of 1,890 angstroms thereby providing a growth rate of 10 angstroms per minute. The index of refraction was about 1.5.

Thus, a product was obtained from this example which comprised a glass base with an aluminum film substrate thereon, on which a continuous, thin, imperforate electrically insulating film adhered to the upper surface of the substrate.

EXAMPLE 2

In the following example, the same apparatus, monomer, and procedures are followed as in example 1. However, a glass substrate is employed. After 185 minutes of ultraviolet surface irradiation during which the substrate temperature was controlled at a maximum temperature of 300° C., the glass film substrate was examined. A continuous film adhered to the substrate.

EXAMPLE 3

In this example, the same apparatus, monomer, and procedures are followed as in example 1. However, the lamp is positioned outside the enclosure and the substrate was evaporated aluminum. The monomer is heated by a heat gun to a temperature of about 205° C., to provide a vapor pressure of 100 microns. After 30 minutes of ultraviolet surface photopolymerization, examination of the aluminum substrate discloses a continuous film adhering to the substrate.

EXAMPLE 4

Apparatus is again set up in accordance with FIG. 1 of the drawing. Twelve grams of 80/100 mesh diamond particles are spread on an aluminum tray about 6 inches long and 1 inch wide. The tray is placed on the upper recessed portion of the substrate support member. An ultraviolet light source, in the form of an Hanovia 700 watt lamp with a reflector, is positioned within the enclosure and in alignment with the substrate support member. The window is then positioned in the upper wall of the enclosure. The system is pumped down to a pressure of 5 microns of mercury and the control valve is closed. Solid pyromellitic diimide is positioned in an area which would be shaded subsequently. A metal hood is positioned around the apparatus. The pyromellitic diimide is heated to about 205° C. by the lamp to provide a vapor pressure of about 100 microns.

The circulating pump is started and ethanol is flowed through the substrate support member. The vibratory device is activated thereby vibrating the diamond particles in the tray. The cooling unit reduces the temperature of the substrate support member, tray and diamond particles to a substrate temperature of about 220° C. resulting in a substantial rate increase in the film formation and a shortening of the time involved. After 30 minutes, the process is concluded by turning off the ultraviolet light source and the vibratory device, stopping the circulating pump, removing the hood, opening the vacuum pump control valve, and pumping down the interior of the enclosure to a pressure of about 1 micron of mercury to remove gaseous material and any by-products therefrom. The vacuum is then broken and the window is removed from the enclosure. The tray with diamond particles is lifted up from the substrate support member. Visual examination discloses an adherent film on at least a portion of the faces of the diamond particles.

EXAMPLE 5

An abrasive grinding wheel with coated diamond particles as described above in example 4 is made. The wheel is 5 inches in diameter by three-sixteenths inch thick. The aluminum wheel core is 4–¾ inches in diameter and has a 1–¼ inch arbor hole. The abrasive rim, which is one-eighth inch by three-sixteenths inch in cross section, contains a 5.46 grams of 80/100 mesh diamond particles, 7.2 grams of FFF grade silicon carbide, and 3.08 grams of 5417 Bakelite phenolic resin. The wheel core and abrasive mix are placed in a compression mold. The loaded mold is placed on a heated platen press, pressed for 30 minutes at about 177° C. at 20,000 pounds of force to stops, then 4,000 pounds with stops removed. The wheel is then post cured for 17 hours with a maximum temperature of about 190° C. for 12 hours.

EXAMPLE 6

In the following example, the same apparatus and procedures were followed as in example 1. However, the monomer was succinimide and an aluminum foil substrate was used. The lamp was positioned outside of the deposition chamber. The solid monomer, which was maintained in a shaded area was heated so as to provide a vapor pressure of about 200 microns. After 60 minutes of ultraviolet surface irradiation during which the substrate temperature was controlled at a maximum temperature of 100° C., the aluminum substrate was examined visually. A continuous, patterned film adhered to the substrate. The film showed a capacitance of 4.7 to $5.4 \times 10^{19}$ farads for counterelectrode areas of 0.1 cm.$^2$, with dissipation factors of about 2 percent.

Several capacitors were made in accordance with the practice of the invention following the procedure shown in copending application Ser. No. 822,788, now U.S. Pat. No. 3,521,339 of A. N. Wright and R. C. Merrill, filed concurrently herewith, which is a continuation-in-part of application Ser. No. 530,813 filed Mar. 1, 1966, now abandoned and assigned to the same assigned to the same assignee as the present invention. In preparing these capacitors, the apparatus of FIG. 1, as described above, was employed. Aluminum was evaporated onto glass to make the first electrode onto which there was configurationally photodeposited on imide-containing photopolymerizable organic material. Aluminum was then evaporated configurationally onto the surface of the imide film. A pair of leads were connected to the respective aluminum electrodes. Table I shows the imides photodeposited, the thicknesses of the films, and some of the characteristics of the result capacitors as measured on a type 1650-A General Radio Company impedance bridge. A signal of 1,000 cycles per second was employed to measure the percent dissipation factor.

TABLE I

| | Imide | Average film Thickness Angstroms |
|---|---|---|
| Example 7 | P-tolylmaleimide | 6,850 |
| 8 | N-phenylphthalimide | 480 |
| 9 | N-vinylphthalimide | 8,550 |
| 10 | methylenedianilinebismaleimide | 525 |
| 11 | N-phenyltetrahydrophthalimide | 332 |
| 12 | N-allylphthalimide | 6,150 |
| 13 | N-phenylmaleimide | 9,750 |

TABLE (continued)

| | Capacitance in Picofarads | % Dissipation Factor at 25° C |
|---|---|---|
| Example 7 | 500 | 0.20 |
| 8 | 7,100 | 0.50 |
| 9 | 400 | 0.35 |
| 10 | 6,500 | |
| 11 | 1,020 | 0.45 |
| 12 | 550 | .45 |
| 13 | 350 | .20 |

Some of the above capacitors were then heated at temperatures up to 300° C. for extended periods of time to determine their ability to resist change in percent dissipation factor (percent DF) which were measured after the capacitors had cooled to room temperature. As distinguished from dielectric film made from butadiene, which changes abruptly in percent DF at about 162° C., the capacitors made from the imide-containing photopolymerizable organic material showed little or no change from their original room temperature values after experiencing temperatures as high as 300° C.

The results obtained with N-phenylmaleimide, "phenyl," and N-vinylphthalimide, "N-vinyl" as compared to butadiene, "$C_4H_{AH}$" WITH RESPECT TO CHANGES IN PERCENT DF above are shown in the following table:

PERCENT DF

| | INITIAL | After 24 hrs. at 200° C. |
|---|---|---|
| N-phenyl | 0.42 | 0.36 |
| N-vinyl | 0.35 | 0.35 |
| $C_4H_6$ | 0.5 | >10% |

Although the above are room temperature values taken after the heating period, the percent DF of the N-phenyl was found to remain about 1.7 at 200° C. over the 24-hour heating period. The butadiene capacitor was found to continuously increase in percent DF when measured at about 162° C.

The capacitor having the N-phenylmaleimide dielectric was then subjected to an extended heat treatment at 300° C. to determine its ability to resist change in percent DF and capacitance which was subsequently measured at room temperature. The results are shown as follows:

| | 3-½ Hrs. | 6 Hrs. | 22-½ Hrs. |
|---|---|---|---|
| Capacitance Picofarads | 630 | 650 | 830 |
| %DF | 0.15 | 0.14 | 0.17 |

As shown above, dielectric films made from N-phenyl maleimide are capable of maintaining their electrical properties at high temperatures over extended periods of time. Those skilled in the art would know that this superior ability to resist change at elevated temperature also would qualify imide films or coatings made in accordance with the practice of the invention as high temperature insulation on electrical conductors either as an enamel or as an overcoat or undercoat structure in combination with barrier layer such as microreinforced woven glass tape, asbestos, quartz, etc.

We claim:

1. A method which comprises effecting the formation of a continuous flexible adherent film on the surface of a substrate by the ultraviolet surface photopolymerization of the vapor of an imide-containing photopolymerizable organic material free of aliphatic unsaturation.

2. A method of claim 1, in which the imide-containing photopolymerizable organic material is pyromellitic diimide.

3. A method as in claim 1, in which the imide-containing photopolymerizable organic material is succinimide.

4. A method of making a capacitor in accordance with claim 1, which comprises (1) effecting the ultraviolet surface polymerization of the vapor of the imide-containing photopolymerizable organic material in contact with the surface of a first electrode to produce a continuous adherent and flexible dielectric film thereon having a thickness of at least 125 angstroms, and (2) thereafter employing a second electrode in association with the resulting dielectric film first electrode composite of (1) to produce a capacitor.

5. A method of making a capacitor roll in accordance with claim 1 which comprises (1) photopolymerizing the vapor of the imide-containing photopolymerizable organic material in contact with the surface of a flexible metal foil to produce a first electrode composite consisting of the metal foil with a continuous and adherent imperforate dielectric film on both sides having a thickness of at least 125 angstroms, and (2) winding the first electrode composite together with a second flexible electrode around a mandrel.

6. A method in accordance with claim 1, where the ultraviolet surface polymerization of the vapor of the imide-containing photopolymerizable organic material is effected by employing ultraviolet light in the region of from about 1,800 angstroms to 3,500 angstroms.

7. A composite comprising a substrate and an adherent thin continuous film on said substrate which consists essentially of a photopolymerized imide-containing organic material free of aliphatic unsaturation.

8. A capacitor in accordance with claim 7, comprising a first electrode, a continuous essentially imperforate dielectric film adhering firmly to the surface of the first electrode, said dielectric film having a thickness of at least about 125 angstroms and being an ultraviolet surface photopolymerized polymer of the imide-containing photopolymerizable organic material, a second electrode in association with the dielectric film-first electrode composite and an electrical lead connected to each of the electrodes.

9. A capacitor in accordance with claim 8 in the form of a capacitor roll, where the first electrode has a dielectric film of the imide-containing photopolymerizable organic material on both sides at a thickness of at least about 125 angstroms.

10. A product in accordance with claim 7, in which the substrate is a particle selected from the class consisting of diamond and borazon.

11. A product as in claim 10, in which a plurality of coated particles are bonded to a grinding wheel rim.

* * * * *